United States Patent Office 3,303,227
Patented Feb. 7, 1967

3,303,227
PREPARATION OF PERHYDROPYRENES
Abraham Schneider, Overbrook Hills, Pa., assignor to Sun Oil Company, Philadelphia, Pa., a corporation of New Jersey
No Drawing. Filed Oct. 7, 1964, Ser. No. 402,347
22 Claims. (Cl. 260—666)

This invention relates to the preparation of hydrocarbons having perhydropyrene structure by the isomerization of naphthenes of the $C_{16}$–$C_{24}$ range which have four rings. The invention includes the conversion of any $C_{16}$–$C_{24}$ tetracyclic naphthenes to hydrocarbons of perhydropyrene structure. These perhydropyrenes can be produced in the form of pure single isomers which have a certain characteristic structure and which are high melting crystalline solids.

Perhydropyrene is a symmetrical four-ring naphthene which can be obtained by hydrogenating the aromatic hydrocarbon, pyrene, and which has sixteen carbon atoms and the following structure:

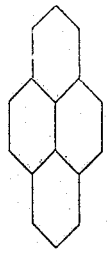

When perhydropyrene is prepared by the catalytic hydrogenation of pyrene, the product is a mixture of several stereoisomers in which the positioning of hydrogen atoms vary.

In the present invention hydrocarbons having the foregoing structure and from sixteen to twenty-four carbon atoms are produced by the isomerization of four-ring naphthenes utilizing catalysts as hereinafter specified. The term "naphthene" as used herein is not intended to include any hydrocarbons which contain an adamantane type of structure. The preferred naphthenes used in the present invention are four-ring perhydroaromatics, but any tetracyclic naphthenes having the specified number of carbon atoms can be used as starting material. Suitable four-ring naphthenes can be obtained by perhydrogenation of tetracyclic aromatics derived from cracked gas oils or from coal tar or they can be synthesized by various known methods. Numerous tetracyclic aromatics which can be converted to naphthenes by hydrogenation are listed in Elsevier's Encyclopedia of Inorganic Chemistry, vol. 14 supplement, pages 2S–4S, and the Encyclopedia gives references to the literature in which the methods of derivation of these four-ring aromatics are shown.

A few examples of naphthenes which can be used in practicing the present invention, the structure thereof and the number of carbon atoms per molecule, are shown in Table I. The compounds listed in Table I are merely exemplary and many others could be given. Tetracyclic naphthenes which are perhydroaromatics are preferred as starting material for practicing the invention, although tetracyclic naphthenes which do not contain any six-member ring can also be used.

TABLE I

| Hydrocarbon | No. of Carbon Atoms | Structural Formula |
|---|---|---|
| Perhydrofluoranthene | 16 | |
| Perhydro-3-ethylpyracene | 16 | —C—C |
| Perhydrochrysofluorene | 17 | |

TABLE I.—Continued

| Hydrocarbon | No. of Carbon Atoms | Structural Formula |
|---|---|---|
| Perhydrochrysene | 18 | |
| Perhydronaphthacene | 18 | |
| Bicyclopentyl-3,3-dicyclopentyl | 20 | |
| Perhydro-2,6-dicyclohexylnaphthalene | 22 | |
| Perhydrotetraphenyl | 24 | |

In the method of the present invention, tetracyclic naphthenes such as those illustrated in Table I are contacted with an aluminum halide catalyst or an HF–BF$_3$ catalyst to form perhydropyrenes having the same number of carbon atoms as the starting hydrocarbon. Sixteen of the carbon atoms will constitute the perhydropyrene nucleus and any in excess of this will constitute methyl and/or ethyl substituents attached to the nucleus. In a preferred manner of practicing the invention involving crystallization of product from the reaction mixture as the isomerization product forms, the product will consist of the highest melting isomer formed. Such isomers generally are compounds in which the carbon atoms in excess of sixteen are in the form of methyl and/or ethyl groups in equitorial conformation and most symmetrically disposed about the nucleus. Furthermore the nucleus will conform to a specific configuration with respect to the hydrogen atoms attached thereto.

By way of illustration the product obtained by isomerizing any C$_{18}$ four-ring naphthene under conditions where crystallization occurs during isomerization is the specific isomer shown by the following structural formula. The numbering system by which perhydropyrenes are herein named is given in the formula.

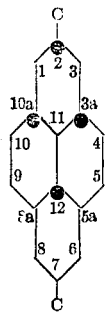

In the formula the heavy dots represent hydrogen atoms projecting upwardly from the surface of the molecule. In naming the compound these hydrogen atoms are designated by "β" whereas the hydrogen atoms projecting from the opposite side of the nucleus are referred to as "α." Specifically the C$_{18}$ isomer which can be obtained in substantially pure form in practicing the present invention is 2-methyl(β)-7-methyl(α)-3a(β)-5a(α)-8a(α)-10a (β)-11(α)-12(β)-perhydropyrene. It has the least strain of all the possible C$_{18}$ isomers, and it is a crystalline solid having a melting point of about 189° C.

Similarly, when four-ring naphthenes having numbers of carbon atoms other than eighteen are reacted according to the present invention, hydrocarbons of perhydropyrene structure again can be obtained in which the hydrogens are β at the 3a, 10a and 12 positions. Thus from a C$_{16}$ four-ring naphthene such as perhydrofluoranthene, the single isomer 3a(β)-5a(α)-8a(α)-10a(β)-11 (α)-12(β)-perhydropyrene can be obtained in essentially pure form. This compound is a crystalline solid having a melting point of about 101° C. Similarly, in the isomerization of tetracyclic naphthenes having 17 carbon atoms, the high melting crystalline hydrocarbon 2-methyl (β)-3a(β)-5a(α)-8a(α)-10a(β)-11(α) - 12(β) - perhydropyrene can be obtained substantially pure.

The present invention thus comprises the conversion of C$_{16}$–C$_{24}$ four-ring naphthenes which have non-perhydropyrene structures to perhydropyrenes and specifically to perhydropyrenes in which the hydrogen atoms are beta at the 3a, 10a and 12 positions. The conversion is effected by contacting the starting naphthene with an aluminum halide catalyst or HF-BF$_3$ catalyst under conditions as hereinafter described.

In a further embodiment of the invention mixed perhydropyrene isomers that have been obtained by catalytically hydrogenating pyrene are converted to the single perhydropyrene isomer named above, utilizing the same catalysts and conditions as are used in the isomerization of the non-perhydropyrene structures.

In a still further embodiment of the invention hydrocarbons having perhydropyrene structure are made from catalytic gas oil fractions that boil in the range of 370–500° C. It has now been found that aromatic recycle stocks produced in processes for the catalytic cracking of higher hydrocarbons to gasoline contain substantial amounts of four-ring aromatic components of the C$_{16}$–C$_{24}$ range which can be utilized as starting material for practicing the present invention. In this embodiment highly aromatic extracts obtained from catalytic gas oil fractions are hydrogenated to convert all unsaturated components therein to saturated hydrocarbons. The hydrogenated product contains a substantial proportion of four-ring naphthenes, and these in admixture with the other hydrocarbons are isomerized in accordance with the invention to produce perhydropyrenes of the $C_{16}$–$C_{24}$ range.

The catalyst for practicing any of the embodiments of the invention can be $AlCl_3$ promoted by HCl, $AlBr_3$ promoted by HBr or the combination of HF and $BF_3$. When an aluminum halide catalyst is used, the reaction temperature should be in the range of $-10°$ to $50°$ C., more preferably $10$–$30°$ C. When an $HBr$-$BF_3$ catalyst is used, the same temperature range is applicable and somewhat higher temperatures ranging up to $70°$ C. can be employed. Reaction times that should be used will vary considerably with the reaction temperature selected and the specific catalyst employed and may vary, for example, from 10 minutes when mixed perhydropyrene isomers are isomerized to the single perhydropyrene isomer specified above to say 48 hours when an $HF$-$BF_3$ catalyst is used at relatively low temperature to convert four-ring naphthenes of non-perhydropyrene structure to perhydropyrenes having the same number of carbon atoms.

In carrying out the isomerization reaction the hydrocarbon starting material in liquid phase is contacted with the isomerization catalyst until the desired conversion is effected. Some four-ring naphthene hydrocarbons will be liquids at the reaction temperature selected, in which case no solvent need be used. With others which are solid at the selected reaction temperature, a saturated hydrocarbon solvent should be employed and preferably a hydrocarbon which is relatively inert under the reaction conditions. Light paraffins from propane to hexanes are relatively inert and can be employed. Higher paraffins are less desirable as they tend to undergo cracking under the reaction conditions. Cyclopentane, methylcyclohexane, dimethylcyclohexanes and trimethylcyclohexanes are also relatively inert and are suitable solvents. On the other hand methylcyclopentane or cyclohexane tend to dimerize to dimethyldecalins under reaction conditions and are less preferred.

In many cases as the reaction proceeds isomerization product of perhydropyrene structure will crystallize from the reaction mixture as it is formed. Whether or not product crystallization occurs will depend upon the proportion of solvent present, the reaction temperature employed and the number of carbon atoms in the four-ring naphthene charge or, in other words, the number and arrangement of alkyl groups on the perhydropyrene nucleus of the product. The reaction can be carried out under conditions either to obtain or to avoid crystallization of product as the reaction proceeds, as desired. Under conditions when the isomerization product remains entirely in liquid phase, it will be a mixture of isomers of perhydropyrene structure except in the case of perhydropyrene itself which gives essentially only the isomer listed in Table II infra. This mixed isomer product from $C_{17}$ or higher charge material can be recovered from the reaction mixture by separating the catalyst from the hydrocarbon phase as by settling and water washing and then distilling solvent from the product.

Usually it will be desirable to carry out the isomerization under conditions such that crystallization of product will occur as the reaction proceeds. This can be done by adjustment of amount of solvent used and appropriate selection of reaction temperature. The product which then crystallizes as the isomerization takes place will be a substantially pure single isomer having $\beta$ hydrogen atoms at the 3a, 10a and 12 positions. Thus, for example, by operating under conditions where crystallization occurs with $C_{17}$ and $C_{18}$ charge material, the individual isomers shown in Table II can be obtained in substantially pure form by separating the product crystals from the reaction mixture. With $C_{16}$ charge material the single isomer listed below will result in any event.

TABLE II

| No. of Carbon Atoms in Charge | Specific Isomer Obtained |
|---|---|
| 16 | 3a($\beta$)-5a($\alpha$)-8a($\alpha$)-10a($\beta$)-11($\alpha$)-12($\beta$)-perhydropyrene. |
| 17 | 2-methyl ($\beta$)-3a($\beta$)-5a($\alpha$)-8a($\alpha$)-10a($\beta$)-11($\alpha$)-12($\beta$)-perhydropyrene. |
| 18 | 2-methyl ($\beta$)-7-methyl ($\alpha$)-3a($\beta$)-5a($\alpha$)-8a($\alpha$)-10a($\beta$)-11($\alpha$)-12($\beta$)-perhydropyrene. |

The three specific isomers listed above do not appear ever to have been produced heretofore in purified form. In such form they are highly crystalline compounds having unusually high melting points for naphthenic hydrocarbons. They have utility as so-called nucleating agents used in the preparation of films from polyolefins such as isotactic polypropylene. In such use the nucleating agent is incorporated in small amount (e.g., 0.1–1%) in the polypropylene while in molten form. When film is thereafter produced from the polypropylene, the nucleating agent which is present therein as minute crystals imparts improved transparency to the film. Examples of such nucleating agents are disclosed in South African Patent No. 61/2552 and No. 62/4069.

As above stated, the isomerization can be effected by an aluminum halide catalyst obtained by combining $AlCl_3$ with HCl or $AlBr_3$ with HBr. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. When the aluminum halide is $AlCl_3$, it is also desirable to maintain a relatively high partial pressure HCl, such as 100–500 p.s.i., in the reaction zone to increase catalytic activity. With the $AlBr_3$ a high partial pressure of HBr is not needed and high activity is obtained as long as there is a slight partial pressure of HBr. The catalyst complex is a colored mobile liquid and typically in the case of $AlBr_3$ is bright orange-yellow.

In preparing the aluminum halide complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such iso-paraffins have at least eight carbon atoms per molecule. A slow degradation of the catalyst may occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials.

When the aluminum halide is $AlBr_3$, the catalyst can also be used with the $AlBr_3$ dissolved in the hydrocarbon so that the reaction mixture is homogeneous. When using this type of catalyst system, the $AlBr_3$ is dissolved in the four-ring naphthene charge, or the four-ring naphthene admixed with hydrocarbon solvent, to the extent of 5–200% by weight of total hydrocarbons present and HBr is pressured into the mixture in amount of at least 0.25% by weight of the hydrocarbons. The resulting reaction mixture remains homogeneous as the reaction occurs. With $AlCl_3$ a homogeneous system cannot be used since $AlCl_3$ is essentially insoluble in hydrocarbons.

In utilizing the aluminum halide complex catalysts described above, the reaction is effected by agitating a mixture of the tetracyclic naphthene charge, solvent if one has been used and the catalyst complex at a temperature as previously specified to provide intimate contact between the hydrocarbon and catalyst phases. The volume ratio of hydrocarbon to catalyst can vary widely, for example, from 0.1:1 to 20:1. The contacting of phases is continued until the desired conversion has been effected. When a soluble $AlBr_3$ catalyst is used, vigorous agitation is not required.

After the desired degree of conversion has been reached, the reaction mixture can be settled to separate the catalyst complex phase from the hydrocarbon phase or phases and the catalyst complex can be recycled and reused. The hydrocarbon material can, if desired, be washed with water to remove any catalyst residues. When the reaction has been conducted under conditions resulting in crystallization, the crystalline product is recovered from the liquid hydrocarbons in any suitable manner such as filtration, centrifugation or decantation.

Besides the aluminum halide catalysts described above, $HF-BF_3$ catalysts can also be used to practice the present process. This type of catalyst system is made from hydrogen fluoride and boron trifluoride together with an initiator. The initiator can be either water or an organic compound containing not more than five carbon atoms which is an olefin, alcohol, ether or alkyl halide. Examples of such organic compounds are ethylene, propylene, isobutylene, pentenes, ethanol, i-propanol, tertiary butanol, 1-pentanol, dimethylether, diethylether, methylisopropylether, dibromomethane, 1-chloropropane, dichloropentanes and the like. The amount of initiator used generally should be 0.005 to 0.3 mole per mole of the four-ring naphthene charge and more preferably 0.01 to 0.10 mole per mole. The amount of HF employed preferably is 25 to 300 moles per mole of initiator, while the amount of $BF_3$ preferably is 5 to 50 moles per mole of initiator. To insure an excess of $BF_3$ the reaction system preferably is maintained under a $BF_3$ partial pressure of 50–200 p.s.i. The resulting $HF-BF_3$ catalyst complex is insoluble in the hydrocarbon charge and is contacted therewith in the same manner as when the aluminum halide complex is used. This effects isomerization of the four-ring naphthenes in substantially the same way as when the aluminum halide complex is used and produces the same products of perhydropyrene structure.

The perhydrogenation of $C_{16}$–$C_{24}$ aromatics having four rings to produce starting material for practicing the present invention can be effected by well known catalytic hydrogenation procedures. One suitable catalyst for this purpose is Raney nickel. Appropriate hydrogenation conditions when using this catalyst include a temperature of 200–275° C., a hydrogen pressure of 2000–4500 p.s.i.g., a catalyst to hydrocarbon weight ratio of 1:4 to 1:10 and a reaction time of 2–12 hours. Other suitable catalysts that can be used include platinum or cobalt molybdate with these hydrogenating components being deposited on alumina. Platinum reforming catalysts available commercially can be used for this purpose. These other catalysts generally are used at the same pressure but at higher temperatures than Raney nickel, such as 300–400° C., in order to effect complete hydrogenation of the polycyclic aromatic hydrocarbons. When the aromatic starting material contains a substantial amount of sulfur compounds as in the case of catalytic gas oils, the sulfur preferably is first removed by hydrodesulfurization using a catalyst such as nickel tungstate or nickel sulfide-tungsten sulfide, following which perhydrogenation is completed using one of the other catalysts.

As pointed out above the invention can be utilized to prepare perhydropyrenes from catalytic gas oils boiling in the range of 370–500° C. For this purpose aromatic extracts from catalytic gas oils boiling above 390° C. preferably are employed. Also preferably, extract fractions of relatively narrow boiling ranges, such as less than 25° C. boiling range spread, are utilized so that the number of carbon atoms in the four-ring aromatic components in any given extract cut will not vary too widely. By way of example, material containing tetracyclic naphthenes which is suitable as feed for the present process can be obtained by extracting a catalytic gas oil with furfural to obtain a wide boiling range extract containing 90% aromatic components, the extract can then be distilled to produce a plurality of fractions boiling in the range of 390–470° C. and each having a boiling range spread of say 15° C. These fractions after being hydrogenated will contain tetracyclic naphthenes ranging essentially from $C_{17}$ to $C_{22}$, and they can be individually treated with an isomerization catalyst as described above to convert such naphthenes to perhydroalkylpyrenes. Reaction products either can be caused to crystallize from the hydrocarbon mixture during the reaction or subsequently can be crystallized from the other hydrocarbons of the reaction mixture by cooling.

The following examples illustrate the invention more specifically:

EXAMPLE I

This example illustrates the isomerization of mixed perhydropyrene isomers which had been obtained by catalytic hydrogenation of pyrene. Complete hydrogenation thereof had been effected by first using a commercial platinum-on-alumina reforming catalyst at about 350° C. and then completing the hydrogenation using Raney nickel catalyst at about 250° C. The product was a mixture of three isomers in the proportions shown in Table III and at room temperature was partly liquid and partly crystalline. This product was heated sufficiently to melt the crystals and the liquid mixture was blended with methylcyclohexane as solvent. Five ml. of the blend having the composition shown in Table III were contacted in a rocker bomb at 25° C. for one hour with an $AlBr_3$ catalyst complex. The complex had been prepared by bubbling HBr into a mixture of 5 g. of $AlBr_3$ and 8 ml. of mixed dimethylhexanes at about 50° C. for about 30 minutes. Thereafter the unreacted hydrocarbons were decanted from the catalyst complex layer and about 3 ml. of the layer were obtained. This was a mobile oily liquid having an orange-yellow color. In spite of the presence of solvent the hydrocarbon product mixture was partly crystalline solid at 25° C. A sample of the total hydrocarbon product was obtained after heating the mixture to melt the crystals and was analyzed by vapor phase chromatography. The results are shown in Table III.

TABLE III

| Components | Composition, weight percent | |
|---|---|---|
| | Charge | Product |
| $C_4$ paraffins | | 1.3 |
| $C_5$ paraffins | | 0.9 |
| $C_6$ paraffins | | 0.5 |
| Dimethylcyclopentanes | | 1.4 |
| Methylcyclohexane | 58.5 | 51.6 |
| $C_8$ naphthenes | | 1.3 |
| $C_9$ naphthenes | | 0.5 |
| $C_{10}$ naphthenes | | 0.4 |
| Decalin | | 0.1 |
| Tetramethyldecalins | | 1.3 |
| Perhydropyrene A | 27.9 | 40.9 |
| Perhydropyrene B | 6.4 | |
| Perhydropyrene C | 7.3 | |

In Table III the perhydropyrene isomer listed as "A" specifically was $3a(\beta)$-$5a(\alpha)$-$8a(\alpha)$-$10a(\beta)$-$11(\alpha)$-$12(\beta)$-perhydropyrene. In the charge this compound, which occurred along with two other isomers, was the major component thereof due to the fact that an acidic platinum-on-alumina catalyst had been used in hydrogenating the pyrene. Upon isomerization the other two isomers converted rapidly and substantially completely to this specific isomer. The latter was recovered from the reaction mixture by separating the catalyst phase, filtering the hydrocarbon portion, washing the crystals with hexane and drying the crystals by evaporating occluded hexane. The resulting A isomer had a melting point of 100.5–101.8° C. and when dehydrogenated yielded pyrene melting at 149.5–150.5° C.

The data in Table III also show that a minor proportion of the methylcyclohexane solvent was converted during the reaction to other hydrocarbons which, however, did not interfer in any way with the desired isomerization.

EXAMPLE II

Perhydrofluoranthene ($C_{16}$) was prepared by hydrogenating fluoranthene using Raney nickel at a temperature of about 250° C. and a hydrogen pressure of 2000–4000 p.s.i.g. The product at room temperature was a liquid mixture of perhydrofluoranthene isomers. An $AlBr_3$ catalyst complex was prepared as in the preceding example and 3.0 ml. of the mixed isomers were contacted with the catalyst at 0° C. The reaction mixture gave off heat and the hydrocarbon mass rapidly crystallized. Three ml. of methylcyclohexane were added, and a liquid mixture was obtained upon heating to 50° C. Cooling again to 0° C. caused extensive crystallization. The mixture was shaken at 27° C. for 312 minutes. Addition then of 3 ml. more cyclohexane gave a complete solution of hydrocarbons. This solution was washed successively with water and concentrated aqueous KOH, and the solvent then was removed by evaporation at 14 mm. Hg. absolute. The residue crystallized and thereafter was recrystallized from ethyl alcohol. The crystalline product had a melting point of 101–102° C. and a mixed melting point of 100–102° C. with perhydropyrene A of Example I. It proved to be the same compound as perhydropyrene A.

EXAMPLE III

The $C_{18}$ tetracyclic aromatic, chrysene, was perhydrogenated using Raney nickel, a temperature of 250° C. and $H_2$ pressure of 4300 p.s.i.g. A mixture of perhydrochrysene isomers was obtained which was a clear liquid at 55° C. and became a viscous liquid containing crystals when cooled to room temperature. A blend of 3.05 g. of this material with 3.01 g. of methylcyclohexane was a clear liquid at 0° C. This blend was shaken at 0° C. with $AlBr_3$ catalyst made as in Example I. Within 10 seconds solidification of the hydrocarbon phase had largely occurred, and after 10 minutes shaking at 0° C. no further reaction took place. The hydrocarbon material was heated with additional methylcyclohexane to dissolve the crystals, and the mixture was cooled and filtered to obtain the crystalline product. All methylcyclohexane occluded therein was removed by evaporation at reduced pressure. The product had a melting point of about 189° C. and proved to be substantially pure 2 - methyl($\beta$) - 7 - methyl($\alpha$)-$3a(\beta)$-$5a(\alpha)$-$8a(\alpha)$-$10a(\beta)$-$11(\alpha)$-$12(\beta)$-perhydropyrene. Its rigid trans-decalin type of structure and the presence of the methyl groups were shown by nuclear magnetic resonance.

EXAMPLE IV

A catalytic gas oil obtained from a commercial catalytic cracking operation was extracted with furfural to yield an extract having an aromatic content of about 91% and a boiling range of about 370–470° C. This extract was distilled into seven cuts having boiling ranges of from about 10° C. to 20° C. Each cut was subjected to low voltage mass spectrometry to determine the types of aromatic structures therein. It was found that all cuts contained tetracyclic aromatic components. Among the four-ring aromatic structures, pyrenes, chrysenes and pyracenes were most prevalent, ranging mainly from $C_{17}$ to $C_{22}$.

A cut of the foregoing gas oil extract, boiling from 414° to 430° C., was first hydrodesulfurized using a nickel tungstate catalyst at 380° C. and a hydrogen pressure of 4000 p.s.i.g. Besides removing the sulfur this also partly hydrogenated the aromatic rings. Complete hydrogenation was then effected by means of Raney nickel at a temperature of 200–250° C. and a hydrogen pressure of 2000–4000 p.s.i.g.

Eight ml. of the perhydrogenated material were then contacted at 0° C. with an $AlBr_3$ catalyst prepared as in Example I. After 82 minutes contact no crystallization of product was evident. Then the temperature was raised to 25° C. and the mixture was shaken for 18 minutes. Upon cooling to 0° C. the mixture showed copious crystallization; and when it again was warmed to room temperature, crystals still remained. The mixture was warmed further to melt all the crystalline material and the liquid mixture was centrifuged to remove the catalyst. The hydrocarbon phase was dissolved in pentane, the solution was washed successively with water and aqueous KOH and then the pentane was evaporated. The resulting product showed extensive crystallization at 25° C. and was practically solid at 0° C. The mixture was filtered at 25° C., following which the solid residue was triturated with acetone at 0° C. and the mixture was filtered. The resulting residue was then treated with hot methylcyclohexane, and the mixture was cooled to 0° C. and filtered. The final residue thus obtained was white crystalline powder having a melting point of 178–186° C. The yield of this product was of the order of 30% by weight of the hydrogenated 414–430° C. cut. By vapor phase chromatography it was determined that this product was mainly 2,6-dimethylperhydropyrene admixed with minor amounts of perhydropyrene and 2-methylperhydropyrene. These were the specific isomers hereinbefore described.

Analogous results can be obtained by isomerizing tetracyclic naphthenes of higher molecular weight and ranging up to 24 carbon atoms. However the tendency for cracking of the tetracyclic naphthenes to occur increases as the number of carbon atoms increases. Hence substantial amounts of such naphthenes, instead of isomerizing, may undergo cracking and thus not convert to a perhydropyrene-type product. Such cracking can be minimized by maintaining the reaction temperature as low as is feasible for obtaining a reasonable isomerization rate.

Compounds prepared in accordance with this invention, in addition to having utility as nucleating agents as previously mentioned, are also useful as intermediates for the preparation of alcohols and acids. Oxidation of the perhydropyrene compounds will yield ketones which can be reduced to alcohols. In these alcohols the hydroxyl group will be attached to the perhydropyrene nucleus mainly at non-ring junction positions. In turn the alcohols can be converted to acids by reaction with sulfuric acid and formic acid, and this conversion of the hydroxyl group to a carboxyl group is accompanied by a shift in position such that the carboxyl group is located at a ring junction position. The carboxyl group thus projects perpendicularly from the nucleus. Alkali metal salts of such acids are useful as a new type of detergent wherein the hydrocarbon moiety is planar and the functional group projects perpendicularly therefrom.

I claim:

1. Method of preparing hydrocarbons having perhydropyrene structure which comprises contacting a naphthene having four rings and 16-24 carbon atoms arranged in a non-perhydropyrene structure at a temperature in the range of $-10°$ to $70°$ C. with a catalyst selected from the group consisting of aluminum halide catalyst and $HF-BF_3$ catalyst, said temperature being below $50°$ C. when an aluminum halide catalyst is used, and continuing such contact until at least a substantial proportion of said naphthene has been converted to hydrocarbon product having perhydropyrene structure.

2. Method according to claim 1 wherein an aluminum halide catalyst is used and said temperature is in the range of $10°$ to $30°$ C.

3. Method according to claim 1 wherein said naphthene has sixteen carbon atoms and said product is $3a(\beta)-5a(\alpha)-8a(\alpha)-10a(\beta)-11(\alpha)-12(\beta)$-perhydropyrene.

4. Method according to claim 3 wherein said naphthene is perhydrofluoranthene.

5. Method according to claim 1 wherein said naphthene has seventeen carbon atoms and said product is 2-methyl$(\beta)-3a(\beta)-5a(\alpha)-8a(\alpha)-10a(\beta)-11(\alpha)-12(\beta)$ - perhydropyrene.

6. Method according to claim 1 wherein said naphthene has eighteen carbon atoms and said product is 2-methyl $(\beta)$ - 7 - methyl$(\alpha)-3a(\beta)-5a(\alpha)-8a(\alpha)-10a(\beta)-11(\alpha)-12(\beta)$-perhydropyrene.

7. Method according to claim 6 wherein said naphthene is perhydrochrysene.

8. Method according to claim 1 wherein said naphthene is a perhydroaromatic hydrocarbon.

9. Method of preparing $3a(\beta)-5a(\alpha)-8a(\alpha)-10a(\beta)-11(\alpha)-12(\beta)$-perhydropyrene by isomerization of a mixture of perhydropyrene isomers obtained by catalytically hydrogenating pyrene which comprises dissolving said mixture in a saturated hydrocarbon solvent, contacting the resulting solution at a temperature in the range of $-10°$ to $70°$ C. with a catalyst selected from the group consisting of aluminum halide catalyst and $HF-BF_3$ catalyst, said temperature being below $50°$ C. when an aluminum halide catalyst is used, whereby $3a(\beta)-5a(\alpha)-8a(\alpha)-10a(\beta)-11(\alpha)-12(\beta)$ - perhydropyrene is formed, and separating the same from the reaction mixture.

10. Method according to claim 9 wherein an aluminum halide catalyst is used and said temperature is in the range of $10°$ to $30°$ C.

11. Method of preparing hydrocarbons having perhydropyrene structure which comprises catalytically hydrogenating an aromatic extract from a catalytic gas oil fraction boiling within the range of $370-500°$ C. and containing at least one tetracyclic aromatic to convert all unsaturated components therein to saturated hydrocarbons, contacting the hydrogenated extract at a temperature in the range of $-10°$ to $70°$ C. with a catalyst selected from the group consisting of aluminum halide catalyst and $HF-BF_3$ catalyst, said temperature being below $50°$ C. when an aluminum halide catalyst is used, whereby hydrocarbons having perhydropyrene structure are formed, and separating said hydrocarbons from the reaction mixture.

12. Method according to claim 11 wherein an aluminum halide catalyst is used and said temperature of contacting is in the range of $10°$ to $30°$ C.

13. Method according to claim 11 wherein said extract boils above $390°$ C. and has a boiling range spread of less than $25°$ C.

14. Substantially pure $3a(\beta)-5a(\alpha)-8a(\alpha)-10a(\beta)-11(\alpha)-12(\beta)$-perhydropyrene.

15. Substantially pure 2-methyl$(\beta)-3a(\beta)-5a(\alpha)-8a(\alpha)-10a(\beta)-11(\alpha)-12(\beta)$-perhydropyrene.

16. Substantially pure 2-methyl$(\beta)$-7-methyl$(\alpha)-3a(\beta)-5a(\alpha)-8a(\alpha)-10a(\beta)-11(\alpha)-12(\beta)$-perhydropyrene.

17. Method according to claim 1 wherein said catalyst is a combination of HF and $BF_3$.

18. Method according to claim 1 wherein said catalyst is $AlBr_3$ promoted by HBr.

19. Method according to claim 18 wherein said catalyst is a pre-formed AlBr-HBr-hydrocarbon complex.

20. Method according to claim 18 wherein said catalyst is $AlBr_3$ dissolved in the hydrocarbon and promoted by gaseous HBr.

21. Method according to claim 1 wherein said catalyst is $AlCl_3$ promoted by HCl.

22. Method according to claim 21 wherein said catalyst is a pre-formed $AlCl_3$-HCl-hydrocarbon complex.

References Cited by the Examiner

UNITED STATES PATENTS 3,128,316   4/1964   Schneider _____ 260—666

OTHER REFERENCES

G. Allegra et al., Tetrahedron Letters, No. 29, pp. 1975–1982, 1964.

DELBERT E. GANTZ, *Primary Examiner.*

V. O'KEEFE, *Assistant Examiner.*